United States Patent [19]

Steinberg

[11] 4,428,437

[45] Jan. 31, 1984

[54] MOUNT ASSEMBLY INCLUDING STRUCTURE TO EFFECT SUBSTANTIALLY CONSTANT BIASING FORCE

[75] Inventor: Richard W. Steinberg, Mankato, Minn.

[73] Assignee: Hiniker Company, Mankato, Minn.

[21] Appl. No.: 241,498

[22] Filed: Mar. 9, 1981

[51] Int. Cl.³ .................. A01B 21/04; A01B 61/04
[52] U.S. Cl. ............................. 172/547; 172/551; 172/572; 172/711; 267/158; 280/699; 474/135
[58] Field of Search ............... 172/142, 335, 336, 347, 172/462, 497, 498, 499, 500, 551, 570, 572, 573, 643, 657, 705, 708, 710, 711, 547; 267/158; 280/699; 474/135

[56] References Cited

U.S. PATENT DOCUMENTS

| 211,003 | 12/1978 | Dunbar | 172/711 |
| 392,695 | 11/1888 | Sheldon | 172/462 |
| 691,571 | 1/1902 | LaDow | 172/711 |
| 787,901 | 4/1905 | Denyes | 172/500 |
| 1,048,040 | 12/1912 | Coates | 172/547 |
| 2,022,335 | 11/1935 | Bernthal | 172/547 |

Primary Examiner—Richard T. Stouffer
Attorney, Agent, or Firm—Burd, Bartz & Gutenkauf

[57] ABSTRACT

A yielding mount assembly connecting a movable arm to a support. The arm is adapted to be attached to a number of structures including an earthworking tool, a rotary hoe wheel, a belt tightener roller, and a wheel supporting a vehicle. The mount assembly has a first member clamped onto the support with a U-bolt. A second member is pivoted on the first member and connected to the arm. A split ring spring mounted on the first and second members holds the arm in a first position. The arm is movable from the first position to a second position against the biasing force of the split ring spring. Expansion of the split ring spring in response to pivotal movement of the arm decreases the spring torque arm so that the biasing force applied to the arm is maintained substantially constant during movement of the arm.

54 Claims, 17 Drawing Figures

MOUNT ASSEMBLY INCLUDING STRUCTURE TO EFFECT SUBSTANTIALLY CONSTANT BIASING FORCE

SUMMARY OF THE INVENTION

The invention is directed to a mount assembly for connecting a movable member, such as an earthworking tool, wheel, or roller, to a support and exerting a substantially constant biasing force on the movable member during movement thereof. The mount assembly has a first member that is connected to the support and a second member connected to the movable member. Pivot means pivotally connect the first and second members together allowing the second member to move about an axis whereby the movable member can be moved between first and second positions. A biasing means mounted on the first and second members operates to bias the movable member to the first position. The biasing means includes a split ring spring means having end portions mounted on the first and second members. On movement of the second member relative to the first member, the split ring spring means is expanded and the spring torque arm relative to the pivot axis decreases such that the biasing force on the movable member is maintained substantially constant during movement thereof between the first and second positions.

The first member has a base engageable with the support. Ear means associated with the base position the first member on the support. Fastener means, as a U-bolt, hold the first member on the support. The first and second members have pockets that accommodate end sections of the split ring spring means. Split sleeves located over the end sections of the split ring spring means provided arcuate bearing surfaces located in the pockets to minimize the wear and stress points on the first and second members.

The pivot means pivotally connecting the first and second members includes cylindrical means that engage arcuate portions of the first and second members. Cap means associated with the arcuate portions and ends of the cylindrical means function to retain the first and second members in pivotal assembled relation with each other. The first and second members have arcuate outwardly directed ribs that surround portions of the cylindrical means. The cap means includes an annular flange located around the arcuate ribs. A means, such as a clamping bolt, holds separate cap means in engagement with opposite ends of the cylindrical means.

The mount assembly is useable in an agricultural implement, such as a field cultivator and rotary hoe. In a field cultivator, a mount assembly is used with a downwardly and forwardly curved resilient arm secured to an earthworking tool or shovel. The biasing means and resilient arm cooperate to permit the tool to ride up and over an obstruction in the ground. In a rotary hoe, a mount assembly connects a rotary hoe arm to a transverse tool bar. A hoe wheel is rotatably mounted on the lower end of each arm. Each hoe wheel independently moves up and down with the contour of the ground. An upwardly curved bar secured to the lower end of each arm is located adjacent one side of the hoe wheel. The bar serves to strip and remove trash or material that may be picked up by the hoe wheel.

The mount assembly is useable in association with a roller engageable with a belt to maintain substantially constant tension on the belt. The split ring spring means acts on the second member of the mount assembly to bias the wheel in engagement with one run of the belt. The biasing force on the belt remains substantially constant over the range of working loads applied to the belt.

The biasing mount assembly is also useable as a spring suspension for a vehicle. The mount assembly is connected to an arm that is rotatably attached to a wheel supported on the ground. The split ring spring means, in association with the pivoting second member of the mount assembly, provides a relatively constant biasing force on the arm such that the frame of the vehicle is subjected to a substantially constant biasing or yielding force as it moves up and down relative to the wheel.

DESCRIPTION OF PREFERRED EMBODIMENTS

Figures 1, 2, 3:
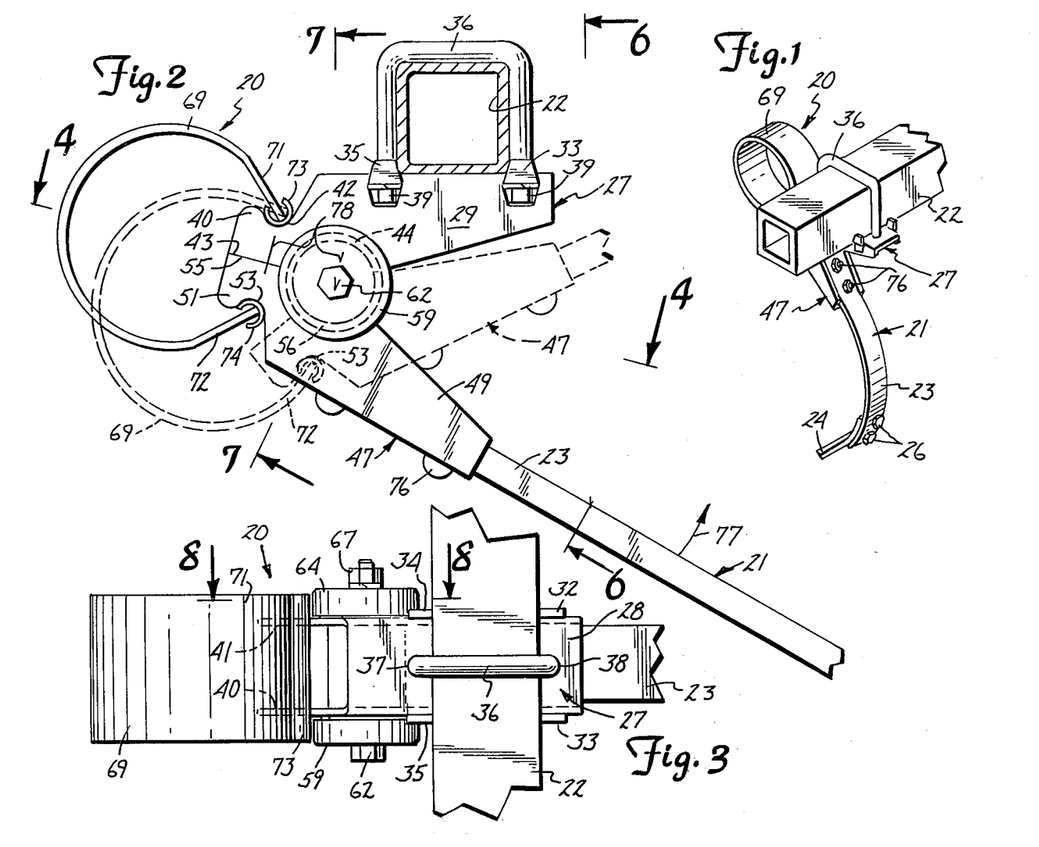
FIG. 1 is a perspective view of an end portion of an earthworking implement having the mount assembly of the invention.
FIG. 2 is an enlarged side elevational view of the mount assembly of FIG. 1 mounted on a tool bar.
FIG. 3 is a top plan view of FIG. 2.

Referring to FIG. 1, there is shown a biasing mount assembly of the invention indicated generally at 20 operatively connecting an earthworking tool 21 to a support 22, such as a tool bar. Support 22 is a generally horizontal beam that can be connected with a conventional three-point hitch to a tractor. Support 22 can be part of the frame structure of an earthworking implement. Tool 21 has a downwardly and rearwardly directed resilient arm spring or shank 23. A replaceable tooth 24 is connected to the lower end of arm 23 with a plurality of plow bolts 26. Tooth 24 can be replaced with other earthworking members, such as sweep and spade shovels. One or more rotary wheels or hoes can be connected to arm 23.

Figures 5, 6, 11:
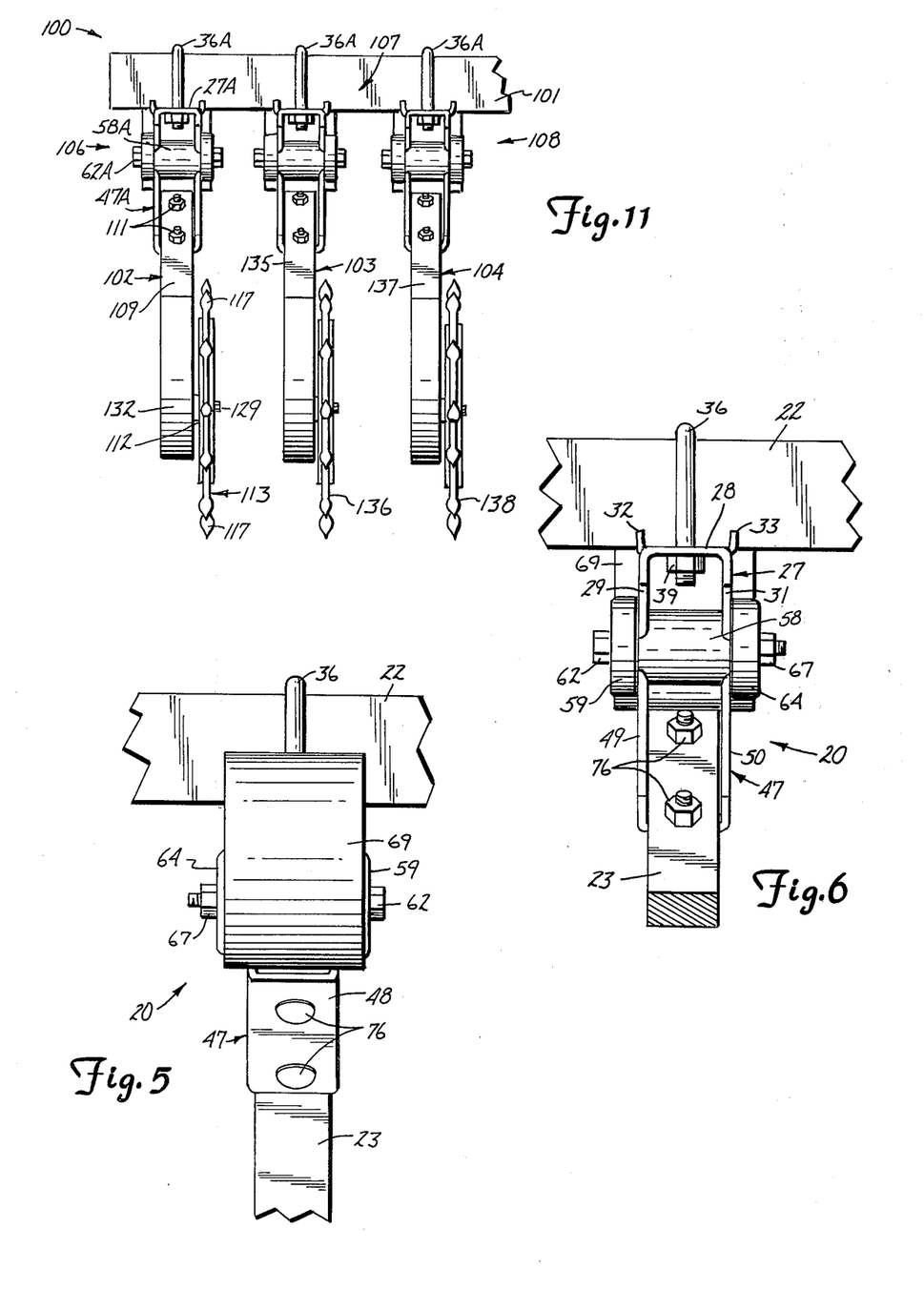
FIG. 5 is a front elevational view of the mount assembly and tool bar of FIG. 2.
FIG. 6 is a sectional view taken along the line 6—6 of FIG. 2.
FIG. 11 is a rear elevational view of FIG. 10.
Figures 7, 8, 9:
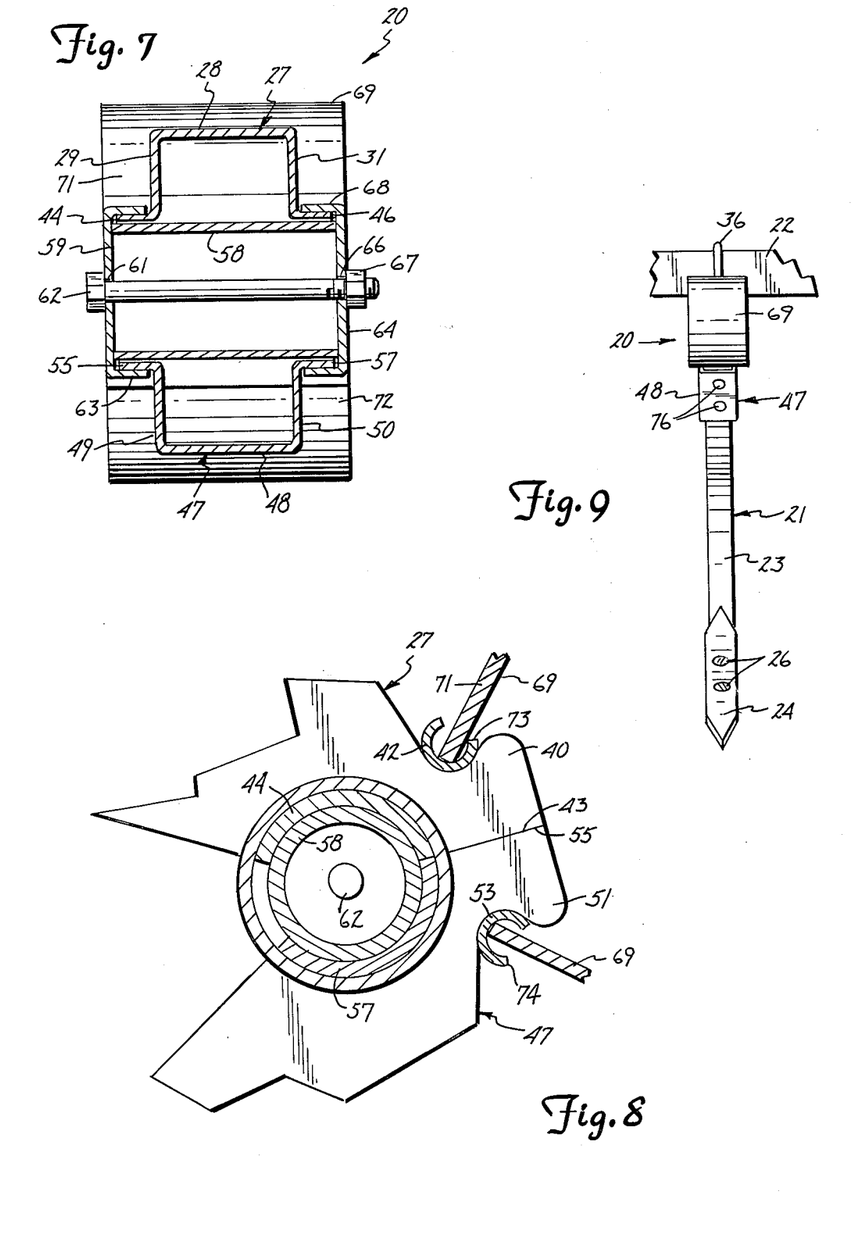
FIG. 7 is an enlarged sectional view taken along the line 7—7 of FIG. 2.
FIG. 8 is an enlarged sectional view taken along the line 8—8 of FIG. 3.
FIG. 9 is enlarged front elevational view of FIG. 1.

Referring to FIGS. 2, 3, and 6, biasing mount assembly 20 has a first member 27 connected to the bottom of support 22 with a U-bolt 36. First member 27 has a flat horizontal base 28 and downwardly extended side walls or flanges 29 and 31. Two pairs of ears 32, 33, and 34 and 35 joined to opposite edges of base 28 extend upwardly therefrom and engage opposite lower corners of support 22 to position member 27 on base 28. U-bolt 36 extends through holes 37 and 38 in base 28. Nuts 39 threaded onto the ends of U-bolt 36 clamp the first member 27 to the bottom of support 22 and hold ears 32, and 33 and 34 and 35 in engagement with support 22. Ears 31, 32, and 34 and 35 function as positioning and stop members for first member 27 which minimize shearing forces on U-bolt 36. Flanges 29 and 31 project in a forward direction and have upwardly directed curved lips 40 and 41. Lips 40 and 41 have recesses or pockets 42 in the upper edges thereof. Pockets 42 are concave curved notches in flanges 29 and 31. The lower portions of lips 40 and 41 have linear bottom edges 43. As shown in FIGS. 7 and 8, flanges 29 and 31 have arcuate ribs 44 and 46 that project in opposite outward directions. Each rib 44 and 46 has an arcuate length of about 160 degrees. The arcuate length of ribs 44 and 46 can vary to change the trip movement of arm 23.

Returning to FIGS. 2 and 6, a second member indicated generally at 47 is located below and pivotally connected to first member 27. The second member 47 has a base 48 and upwardly directed side walls or flanges 49 and 50. Flanges 49 and 50 project in a forward direction and terminate in downwardly directed lips 51 and 52. The lips 51 and 52 have downwardly open pockets or recesses 53, as shown in FIG. 2. Pockets 53 are concave curved notches in flanges 49 and 50. The upper portions of lips 51 and 52 have linear edges 54 and 55 that engage the linear edges 43 of first member 46 and serve as stops for the second member 47. When edges 54, 55, and 43 are in engagement with each other, as shown in FIG. 2, arm 23 is in its down or earthworking position. Flanges 49 and 50 have outwardly directed arcuate ribs 56 and 57 located about a sleeve or cylindrical member 58. Arcuate ribs 56 and 57 have an arcuate length of about 160 degrees. Arcuate ribs 44, 46, and 56 and 57 have inner arcuate surfaces that engage outer surfaces of the outer ends of sleeve 58, whereby the first member 27 and second member 47 can angularly move relative to each other about the transverse axis of sleeve 58. First and second retaining caps 59 and 64 and a bolt 62 hold the first and second members 27 and 47 in assembled relation with sleeve 58. Cap 59 is a cup-shaped member having a central hole 61 accommodating the body of bolt 62. A circular rim 63 on cap 59 surrounds flanges 44 and 55 and provides with sleeve 58 an arcuate channel for allowing limited arcuate movement of the second member 47 relative to the first member 27. Second cap 64 is a cup-shaped member having a central hole 66 accommodating the nut end of bolt 62. Nut 67 threaded on bolt 62 holds the first and second caps 59 and 64 in clamping engagement with the opposite ends of sleeve 58. Cap 64 has a circular rim 68 surrounding arcuate ribs 46 and 57. Rim 68 is spaced from sleeve 58 to provide an arcuate channel allowing limited arcuate movement of second member 47 about the axis of bolt 62.

As shown in FIG. 2, compression split ring spring 69 functions as a biasing means to yieldably hold second member 47 in a first or earthworking position relative to first member 27. The ring spring 69 is a C-shaped spring having opposite ends 71 and 72. End 71 is located in a split sleeve 73 located in the pockets 42 of the first member 27. A second split sleeve 74 accommodates the end 72. Sleeve 74 is located in the pockets 53 of second member 47. Split sleeves 73 and 74 have outer cylindrical surfaces which conform to the arcuate surfaces of pockets 42 and 53. Sleeves 73 and 74 have limited arcuate movement in pockets 42 and 53 which reduces wear and cutting of lips 40, 41, 51, and 52. Split ring spring 69 is made of spring steel and functions as a pre-loaded compression spring to yieldably hold second member 47 in engagement with the forward section of first member 27, as shown in full lines in FIG. 2. One or more additional C-shaped springs can be attached to ring spring 69 to increase the biasing force of the ring on member 47. The edges 54 and 55 of the second member are held in engagement with the lower edges 43 of the lips 40 and 41 of the first member 27.

Figure 4:
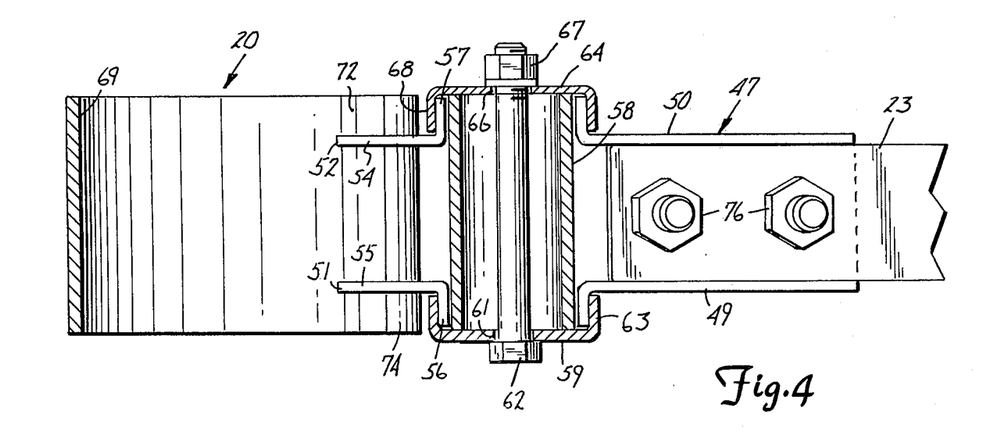
FIG. 4 is an enlarged sectional view taken along the line 4—4 of FIG. 2.

As shown in FIGS. 4 and 6, a pair of nut and bolt assemblies 76 extend through holes in base 48 and upper end of standard 23 to secure the standard to the second member 47. The upper end of arm 43 is located in the channel of the second member 47. The sides of arm 43 are located in engagement with flanges 49 and 50, as shown in FIG. 4.

In use, when tooth 24 strikes an obstruction, such as a rock, arm 23 will flex rearwardly and move upwardly in the direction of the arrow 77 thereby allowing tooth 24 to ride over the obstruction. Arm 23 can move to a second or raised position, as shown in broken lines in FIG. 2. When the flanges 49 and 50 of second member 47 engage flanges 29 and 31 of the second member 27, the second member is in its full raised position. Arm 23 pivots about the axis of bolt 62, since arcuate ribs 56 and 57 of the second member 49 are concentric with the axis of bolt 62. The pocket 53 of the second member 49 moves about the axis of bolt 62 and expands or opens the mouth of the split ring spring 69, as shown in broken lines. The torque arm 78, shown as distance in FIG. 2, of the second member 49 relative to the end 72 of spring 69 decreases in length as the second member 49 pivots in an upward direction. As the split ring 69 is expanded, the ring end 72 in sleeve 74 moves along an arc centered on bolt 62. The torque arm 78 is reduced in length until the end 72 is in the broken line position, as shown in FIG. 2. The split ring spring 69 has spring or deflection characteristics such that as the deflection of the ring spring increases, the biasing force of the ring increases. In other words, the force required to expand the split ring spring 69 increases in relation to the amount of expansion or deflection of the ring spring 69. The torque arm varies or changes in length in inverse proportion to the spring force to effect a substantially constant biasing force on the arm 23. The decreasing torque arm compensates for the increase in the amount of force required to expand ring spring 69 so that the resultant force required to raise arm 23 remains substantially the same from the ground working or first position, as shown in full lines in FIG. 2, to the up or trip position, as shown in broken lines. The biasing force on arm 23 is substantially the same when it is in the ground working position and trip position and all positions between the ground working position and trip position. When the tooth 24 clears the obstruction, split ring spring 69 will automatically bias second member 49 and earthworking tool 21 back to its first or normal ground working position.

Figures 10, 12, 13:
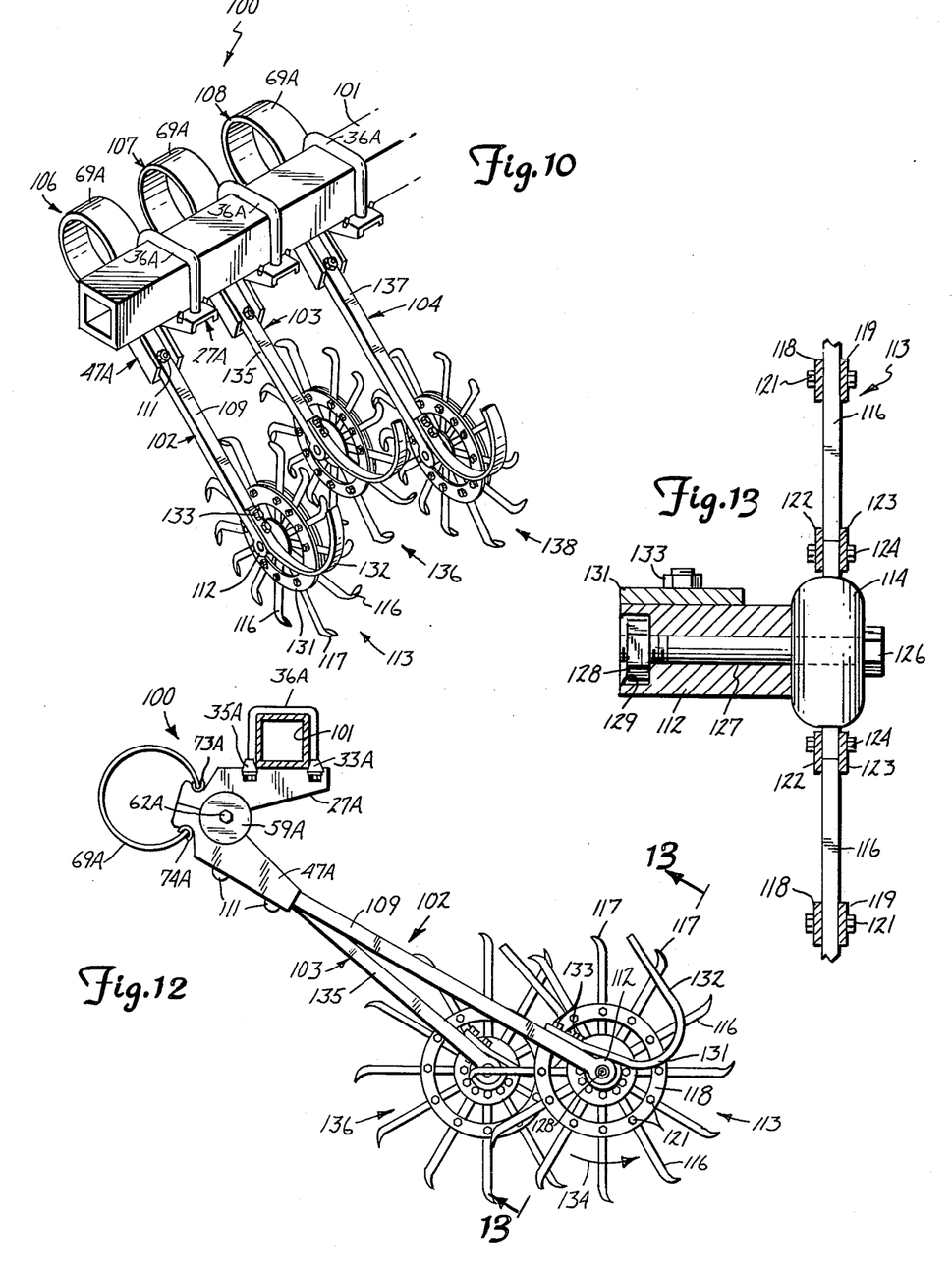
FIG. 10 is a perspective view of a section of a rotary hoe equipped with the mount assembly of the invention.
FIG. 12 is a side elevational view of the rotary hoe section of FIG. 10.
FIG. 13 is an enlarged sectional view taken along the line 13—13 of FIG. 12.

Referring to FIGS. 10, 11, and 12, there is shown an end portion of an earthworking implement indicated generally at 100, known as a rotary hoe. Examples of rotary hoes mounted on a three-point hitch of a tractor are shown by Zaun in U.S. Pat. No. 3,734,201 and Siekmeier U.S. Pat. No. 3,967,685. Implement 100 has a transverse horizontal tool bar or support 101 carrying a plurality of earthworking tools 102, 103, and 104. Biasing mount assemblies indicated generally at 106, 107, and 108 mount the tools 102, 103, and 104 on tool bar 101 for individual and independent movement. The number of earthworking tools and biasing mount assemblies attached to tool bar 101 can vary. Also, the spacing between adjacent earthworking tools can be adjusted.

The biasing assemblies 106, 107, and 108 are identical in structure and fucntion. They are the same as biasing mount assembly 20, shown in FIGS. 2-8. The parts of biasing mount assembly 106 correspond to the parts of biasing mount assembly 20 having the same reference numeral with the suffix A.

Earthworking tool 102 has an elongated linear arm or standard 109 extended from biasing mount assembly 106 to an earthworking wheel indicated generally at 113. As shown in FIG. 13, the lower end of arm 109 has an enlarged section or boss 112 having an end located adjacent wheel 113. Wheel 113 has a central bearing assembly 114 attached to a plurality of circumferentially arranged teeth or spokes 116. The outer end of each tooth has a spoon bill or lip 117. A first pair of rings 118 and 119 clamp to opposite sides of the teeth 116 with nut and bolt assemblies 121. The second rings 122 and 123 are attached to the bearing assembly 114 with nut and bolt assemblies 124 to retain the inner ends of the rings in operative association with bearing assembly 114. Bearing assembly 115 is held into engagement with the boss 112 by a bolt 126. Bolt 126 extends through a transverse bore 127 in boss 112. A nut 128 located in a recess or cavity 129 in boss 112 is threaded on bolt 126. Cavity 129 has a noncircular shape which cooperates with he nut 128 to prevent the nut from turning during the attachment of the bolt 126 to nut 128. Preferably, the shape of cavity 129 is the same as the shape of nut 128.

A trash cleaning or stripper bar 131 is connected on the lower end of arm 109 with a plurality of nut and bolt assemblies 133. Bar 131 projects in a rearward direction from boss 112 and has an upwardly curved terminal end section 132. End section 132 projects beyond the outer ends of teeth 116. Bar 131 is a curved leaf spring having an edge located close to one side of wheel 113. In use, when the implement is moved in the forward direction, wheel 116 will rotate in a counterclockwise direction, as shown by the arrow 134. Trash, as weeds, corn stalks, and the like, which may collect on teeth 116, will be moved upwardly into engagement with the curved end 132 of bar 131. The end 132 forces or strips the trash from teeth 116.

As shown in FIGS. 10 and 11, earthworking tool 103 has an arm 135 extended downwardly and rearwardly from the biasing mount assembly 107 to an earthworking wheel 136. Arm 135 has a length shorter than arm 109 whereby wheel 136 is longitudinally offset from wheel 113. This arrangement locates adjacent wheels in a staggered relationship along the transverse length of the implement.

Earthworking tool 104 has an arm 137 identical to the arm 109 attaching biasing mount assembly 108 to the earthworking wheel 138. Earthworking tool 104 is identical to earthworking tool 102.

In use, compression split ring spring 69A of each biasing mount assembly functions to independently and individually bias the arms 109, 135, and 137 in a downward or earthworking position. The arms 109, 135, and 137 are free to separately move up and down to follow the contour of the ground and move over trash and obstructions. Trash that is picked up by teeth 116 will be removed or stripped off by the curved trash cleaning bar 131.

Figure 14:
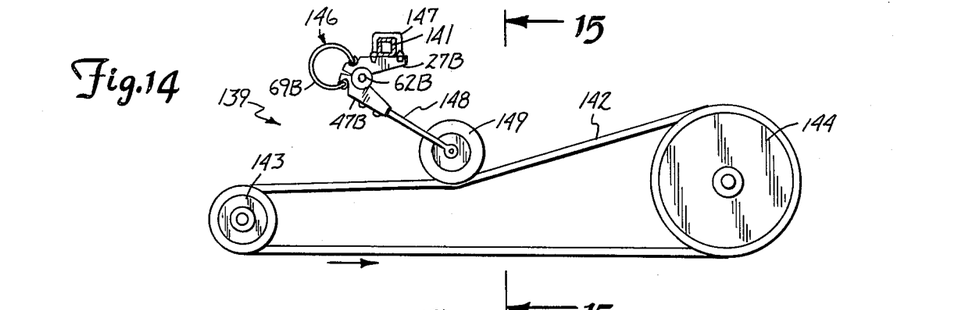
FIG. 14 is a side elevational view of a mount assembly used with a roller as a belt tightener.
Figure 15:
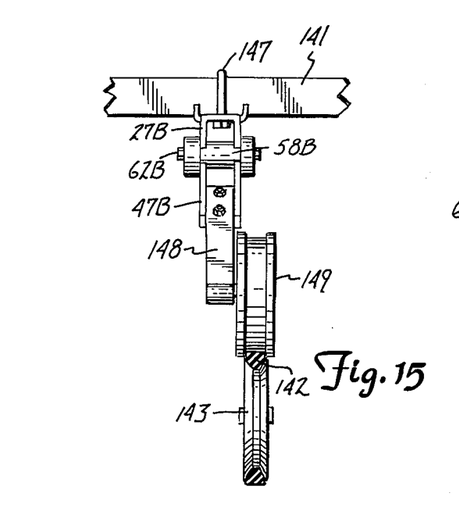
FIG. 15 is a sectional view taken along the line 15—15 of FIG. 14.

Referring to FIGS. 14 and 15, there is shown a belt tightener indicated generally at 139 mounted on a support 141 for tightening an upper run of a belt 142. Belt 142 is trained around pulleys 143 and 144 and is moved thereby to transmit power between these pulleys. A biasing mount assembly indicated generally at 146 is connected with a U-bolt 147 to support 141. A downwardly extended arm 148 is secured to biasing mount assembly 146. A roller or wheel 149 riding on belt 142 is rotatably mounted on the lower end of arm 148. The biasing mount assembly 146 is identical to the biasing mount assembly 20, as shown in FIGS. 2-8. The parts of biasing mount assembly 146 that correspond to the parts of biasing mount assembly 20 are identified with the same reference numeral having a suffix B. The biasing mount assembly 146 functions to bias wheel 149 in a downward direction to apply tension to belt 142. As the power transmitted by the belt increases, the biasing mount assembly 146 functions to maintain a substantially constant force on belt 142, since split ring 69B, as it moves relative to the axis of the bolt 62B, applied substantially the same force on wheel 149 whereby the tension on the belt remains substantially constant over the range of power transmitted by the belt. Roller 149 moves up and down to maintain a substantially constant force on the top run of belt 142.

Figure 16:
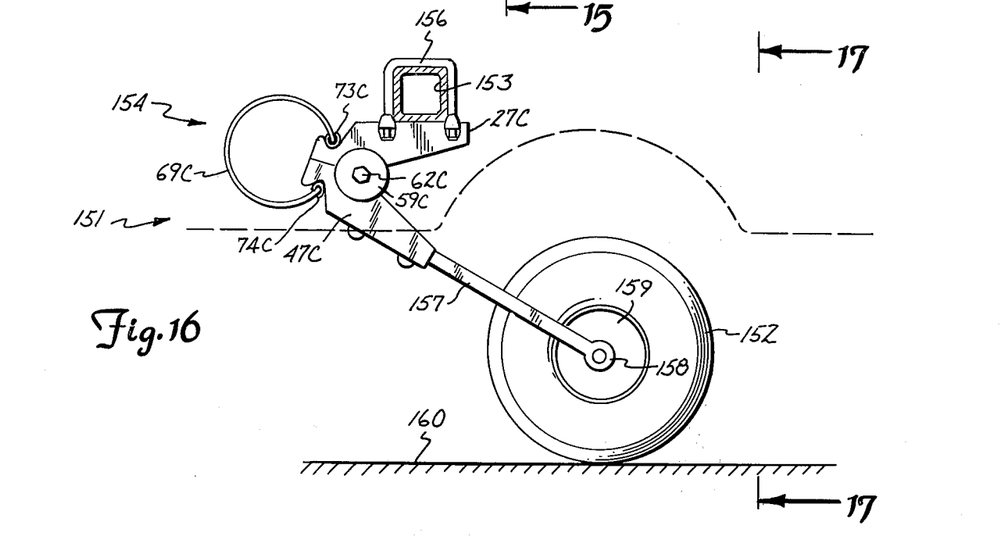
FIG. 16 is a side elevational view of the mount assembly used as a spring suspension for a wheel of a vehicle.
Figure 17:
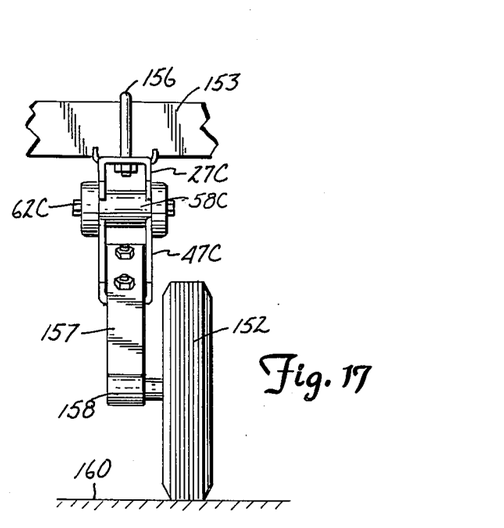
FIG. 17 is an elevational view taken along the line 17—17 of FIG. 16.

Referring to FIGS. 16 and 17, there is shown a vehicle wheel suspension assembly indicated generally at 151 connecting a wheel 152 to a frame or support 153. The wheel suspension assembly is useable with trailers, motor vehicles, manually moved vehicles, implements, and like vehicles and machines.

A biasing mount assembly indicated generally at 154 is connected with a U-bolt 156 to support 153. Wheel 152 is connected to the biasing mount assembly with an arm 157. The lower end of arm 157 carries the transverse axle 158. Wheel 152 has a hub assembly 159 rotatably mounted on axle 158.

Biasing mount assembly 154 is identical to the biasing mount assembly 20, shown in FIGS. 2-8. The parts of biasing mount assembly 154 that are identical to the parts of biasing mount assembly 20 have the same reference numeral with the suffix C.

The split ring 69C yieldably holds frame 153 in an elevated or raised position when wheel 152 is on the ground 160. Wheel 152 can ride up and down over to follow the contour of ground 160 providing a substantially constant spring or yielding force for supporting frame 153. As the split ring 69C expands or opens, the torque arm of the lower end of the spring relative to the axis of bolt 62C decreases whereby the resultant biasing force of ring spring 69C on arm 156 remains substantially constant.

While there has been shown and described the preferred embodiments and uses of the biasing mount assembly of the invention, it is understood that changes in the structure and use may be made by those skilled in the art without departing from the invention. The invention is defined in the following claims.

The embodiments of the invention in which an exclusive property or privilege is claimed are defined as follows:

1. A mount assembly for connecting a movable member to a support comprising: a first member, means for attaching the first member to the support, a second member for supporting the movable member, means pivotally connecting the first and second members allowing the second member to move about an axis between a first position and a second position, and biasing means mounted on the first and second members to bias the second member to the first position, said biasing means including split ring spring means having a first end mounted on the first member and a second end mounted on the second member, said second end moving relative to said axis on movement of the second member to vary the split ring spring means torque arm relative to the axis so as to maintain a substantially constant biasing force on the second member during movement thereof between the first and second positions, said first member having arcuate outwardly directed ribs and said second member having arcuate outwardly directed ribs, said means pivotally connecting the first and second members including a cylindrical member, said arcuate ribs of the first and second members surrounding opposite portions of the cylindrical member, cap means surrounding said ribs and engageable with opposite ends of the cylindrical member, and means holding the cap means in engagement with the cylindrical member.

2. The assembly of claim 1 wherein: the first member has a base engageable with the support and first flange means secured to the base, said first flange means having first pocket means accommodating the first end of the split ring spring means, said second member including second flange means having second pocket means accommodating the second end of the split ring spring means.

3. The assembly of claim 2 including: first split sleeve means located in said first pocket means and about said first end of the split ring spring means, and second split sleeve means located in said second pocket means and about said second end of the split ring spring means.

4. The assembly of claim 3 wherein: said first and second split sleeve means each have an outer arcuate surface, and each pocket means has an arcuate shape that conforms to the arcuate surface of a sleeve means.

5. The assembly of claim 1 wherein: the first member has a base engageable with the support, and ear means engageable with the support to locate the first member on the support.

6. The assembly of claim 5 wherein: said ear means include a first pair of ears projected upwardly from opposite sides of the base and engageable with one side of the support, and a second pair of ears projected upwardly from opposite sides of the base, said second pair of ears being engageable with the side opposite said one side of the support.

7. A mount assembly for connecting a movable member to a support comprising: a first member, means for attaching the first member to the support, a second member for supporting the movable member, means pivotally connecting the first and second members allowing the second member to move about an axis between a first position and a second position, and biasing means mounted on the first and second members to bias the second member to the first position, said biasing means including split ring spring means having a first end mountable on the first member and a second end mountable on the second member, said second end moving relative to said axis on movement of the second member to vary the split spring means torque arm relative to the axis so as to maintain a substantially constant biasing force on the second member during movement thereof between the first and second positions, said first member being a generally U-shaped member having first arcuate ribs projected outwardly from opposite sides thereof, said second member being a generally U-shaped member having said arcuate ribs projected outwardly from opposite sides thereof, said means pivotally connecting the second member to the first member including cylindrical means, said first and second arcuate ribs being located adjacent opposite portions of the cylindrical means, and means surrounding said first and second arcuate ribs for holding the first and second members in assembled relation with cylindrical means.

8. The assembly of claim 7 wherein: said cylindrical means has opposite ends, said means surrounding said first and second arcuate ribs includes a first cap and a second cap engageable with said opposite ends of the cylindrical means, each of said caps having an annular rim surrounding said first and second ribs, and means holding the first and second caps in engagement with opposite ends of the cylindrical means.

9. A mount assembly for connecting a movable member to a support comprising: a first member adapted to be connected to the support, a second member for supporting the movable member, pivot means pivotally connecting the first and second members allowing movement of said movable member between first and second positions, biasing means mounted on said first and second members for biasing the second member to a position to hold the movable member in said first position and allow said movable member to be moved to a second position, said biasing means having a portion movable with said second member to change the torque arm of the biasing means to effect a substantially constant biasing force on said movable member during movement thereof between said first and second positions, said first member having arcuate outwardly directed ribs and said second member having arcuate outwardly directed ribs, said pivot means including a cylindrical member, said arcuate ribs of the first and second members surrounding opposite portions of the cylindrical member, cap means surrounding said ribs and engageable with the opposite ends of the cylindrical member, and means holding the cap means in engagement with the ends of the cylindrical member.

10. The assembly of claim 9 wherein: said biasing means is a split ring spring means, said spring means having end portions mounted on said first and second members.

11. The assembly of claim 9 wherein: said first member has a first pocket, and said second member has a second pocket cooperating with said biasing means to retain the biasing means in assembled relation with the first and second members.

12. The assembly of claim 11 including: first split sleeve means located in said first pocket and associated with the portion of the biasing means and second split sleeve means located in said second pocket and associated with another portion of the biasing means.

13. The assembly of claim 12 wherein: said first and second split sleeve means each have an outer arcuate surface, and each pocket means has an arcuate shape that conforms to the arcuate surface of a sleeve means.

14. The assembly of claim 12 wherein: said biasing means is a split ring spring means, said spring means having a first end portion extended into said first split sleeve means and a second end portion extended into said second split sleeve means.

15. The assembly of claim 9 wherein: the biasing means is a split ring spring means having a first end and a second end separated from the first end, said first member having a base engageable with a support and first flange means secured to said base, said first flange means having a first pocket means accommodating the first end of the split ring spring means, said second member including second flange means having second pocket means accommodating the second end of the split ring spring means.

16. The assembly of claim 15 including: first split sleeve means located in said first pocket means and about said first end of the split ring spring means, and second split sleeve means located in said second pocket means and about said second end of the split ring spring means.

17. The assembly of claim 16 wherein: said first and second split sleeve means each have an outer arcuate surface, and each pocket means has an arcuate shape that conforms to the arcuate surface of the sleeve means.

18. The assembly of claim 9 wherein: said cap means includes annular rim means surrounding said ribs.

19. A mount assembly for connecting a movable member to a support comprising: a first member adapted to be connected to the support, a second member for supporting the movable member, pivot means pivotally connecting the first and second members allowing movement of said movable member between first and second positions, biasing means mounted on said first and second members for biasing the second member to a position to hold the movable member in a first position and allow said movable member to be moved to a second position, said biasing means having a portion movable with said second member to change the torque arm of the biasing means to effect a substantially constant biasing force on said movable member during movement thereof between said first and second positions, said first member being a generally U-shaped member having first arcuate ribs projected outwardly from opposite sides thereof, said second member being a generally U-shaped member having second arcuate ribs projected outwardly from opposite sides thereof, said first and second ribs being located about said axis, said pivot means including cylindrical means, said first and second arcuate ribs being located adjacent opposite portions of the cylindrical means, and means surrounding said first and second arcuate ribs for holding the first and second member in assembled relation with the cylindrical means whereby said second member has limited pivotal movement relative to said axis.

20. The assembly of claim 19 wherein: said cylindrical means has opposite ends, said means surrounding said first and second arcuate ribs includes a first cap and a second cap engageable with said opposite ends of the cylindrical means, each of said caps having an annular rim surrounding said first and second ribs, and means holding the first and second caps in engagement with opposite ends of the cylindrical means.

21. The assembly of claim 19 wherein: the first member has a base engageable with a support, and ear means engageable with the support to locate the first member on the support.

22. The assembly of claim 21 wherein: said ear means includes a first pair of ears projected upwardly from opposite sides of the base and engageable with one side of the support, and a second pair of ears projected upwardly from opposite sides of the base, said second pair of ears being engageable with the side opposite said one side of the support.

23. An earthworking implement comprising: a support, earthworking tool means for working the soil, and a mount assembly attaching the earthworking tool means to said support, said mount assembly comprising a first member, means attaching the first member to the support, a second member, means connecting the earthworking tool means to said second member, pivot means connecting the first and second members allowing movement of the second member and earthworking tool means about an axis between a first earthworking position and a second position above said first position, and biasing means mounted on the first and second members to bias the second member and earthworking tool means to said earthworking position, said biasing means including split ring spring means mounted on the first and second members, said split ring spring means having a portion mounted on the second member, said portion movable relative to said axis on movement of the second member to vary the spring means torque arm of the second member relative to the split ring spring means so as to maintain a substantially constant biasing force on the second member and earthworking tool means during movement thereof between the earthworking position and the second position, said first member having an arcuate outwardly directed first rib means and said second member having an arcuate outwardly directed second rib means, said means pivotally connecting the first and second members including cylindrical means, said first and second arcuate ribs surrounding opposite portions of said cylindrical means, cap means surrounding said first and second ribs and engageable with opposite ends of the cylindrical means, and means holding the cap means in engagement with said cylindrical means.

24. The implement of claim 23 wherein: said first member has a base, said base having ear means engageable with said support to locate the first member on said support.

25. The implement of claim 23 wherein: the first member has a base engageable with the support, and first flange means secured to the base, said first flange means having first pocket means accommodating a portion of the split ring spring means, said second member including a second flange having second pocket means accommodating another portion of the split ring spring means.

26. The implement of claim 25 including: first split sleeve means located in said first pocket means and associated with the first portion of the split ring spring means, and second split sleeve means located in said second pocket means and associated with the second portion of the split ring spring means.

27. The implement of claim 26 wherein: said first and second split sleeve means each have an outer arcuate surface, and each pocket means has an arcuate shape that conforms to the arcuate surface of a sleeve means.

28. The implement of claim 23 wherein: said earthworking tool means includes an arm secured to the second member and earthworking means mounted on said arm.

29. The implement of claim 28 wherein: said arm is a curved spring member.

30. The implement of claim 28 wherein: said earthworking means is a rotary hoe wheel.

31. The implement of claim 28 wherein: said earthworking tool means includes an arm connected to the second member, rotary hoe wheel means rotatably mounted on said arm, and bar means secured to said arm and located adjacent said rotary hoe wheel means for removing trash from said wheel means.

32. The implement of claim 31 wherein: said wheel means comprises a single hoe wheel rotatably mounted on said arm.

33. A mount assembly for connecting a wheel to a support comprising: means for connecting the mount assembly to the support, arm means for connecting the wheel to said mount assembly, said mount assembly having a first member adapted to be connected to said support, a second member, said arm means being connected to the second member, pivot means pivotally connecting the first and second members allowing movement of said arm means between first and second positions, and biasing means mounted on said first and second members for biasing the second member to a position to hold the arm means in said first position and allow said arm means to move to the second position, said biasing means having a portion movable with said second member to effect a substantially constant biasing force on said arm means during movement thereof between said first and second positions, said first member having arcuate outwardly directed ribs and the second member having arcuate outwardly directed ribs, said pivot means including a cylindrical member, said arcuate ribs of the first and second members surrounding opposite portions of the cylindrical member, cap means surrounding said ribs and engageable with opposite ends of the cylindrical member, and means holding the cap means in engagement with the cylindrical member.

34. The assembly of claim 33 wherein: said biasing means is a split ring spring means, said spring means having end portions mounted on said first and second members.

35. The assembly of claim 33 including: a wheel rotatably mounted on said arm.

36. The assembly of claim 33 including: a hoe wheel rotatably mounted on said arm.

37. The assembly of claim 33 wherein: said first member has a first pocket, and said second member has a second pocket cooperating with said biasing means to retain the biasing means in assembled relation with the first and second members.

38. The assembly of claim 37 including: first split sleeve means located in said first pocket and associated with the portion of the biasing means and second split sleeve means located in said second pocket and associated with another portion of the biasing means.

39. The assembly of claim 38 wherein: said first and second split sleeve means each have an outer arcuate surface, and each pocket means has an arcuate shape that conforms to the arcuate surface of a sleeve means.

40. The assembly of claim 38 wherein: said biasing means is a split ring spring means, said spring means having a first end portion extended into said first split sleeve means and a second end portion extended into said second split sleeve means.

41. The assembly of claim 33 wherein: said first member having a base engageable with a support and the biasing means is a split ring spring means having a first end and a second end separated from the first end, first flange means secured to said base, said first flange means having a first pocket means accommodating the first end of the split ring spring means, said second member including second flange means having second pocket means accommodating the second end of the split ring spring means.

42. The assembly of claim 41 including: first split sleeve means located in said first pocket means and about said first end of the split ring spring means, and second split sleeve means located in said second pocket means and about said second end of the split ring spring means.

43. The assembly of claim 42 wherein: said first and second split sleeve means each have an outer arcuate surface, and each pocket means has an arcuate shape that conforms to the arcuate surface of the sleeve means.

44. The assembly of claim 33 wherein: said cap means includes annular rim means surrounding said ribs.

45. A mount assembly for connecting a wheel to a support comprising: means for connecting the mount assembly to the support, arm means for connecting the wheel to said mount assembly, said mount assembly having a first member adapted to be connected to said support, a second member, said arm means being connected to the second member, pivot means pivotally connecting the first and second members allowing movement of said arm means between first and second positions, and biasing means mounted on said first and second members for biasing the second member to a position to hold the arm means in said first position and allow said arm means to move to the second position, said biasing means having a portion movable with said second member to effect a substantially constant biasing force on said arm means during movement thereof between said first and second positions, said first member being a generally U-shaped member having first arcuate ribs projected outwardly from opposite sides thereof, said second member is a generally U-shaped member having second arcuate ribs projected outwardly from opposite sides thereof, said first and second ribs being located about said axis, said pivot means including cylindrical means, said first and second arcuate ribs being located adjacent opposite portions of the cylindrical means, and means surrounding said first and second arcuate ribs for holding the first and second member in assembled relation with the cylindrical means whereby said second member has limited pivotal movement relative to said axis.

46. The assembly of claim 45 wherein: said cylindrical means has opposite ends, said means surrounding said first and second arcuate ribs includes a first cap and a second cap engageable with said opposite ends of the cylindrical means, each of said caps having an annular rim surrounding said first and second ribs, and means holding the first and second caps in engagement with opposite ends of the cylindrical means.

47. The assembly of claim 45 wherein: the first member has a base engageable with a support, and ear means engageable with the support to locate the first member on the support.

48. The assembly of claim 47 wherein: said ear means includes a first pair of ears projected upwardly from opposite sides of the base and engageable with one side of the support, and a second pair of ears projected upwardly from opposite sides of the base, said second pair of ears being engageable with the side opposite said one side of the support.

49. A mount assembly for connecting a movable member to a support comprising: a first member, means for attaching the first member to the support, a second member for supporting the movable member, pivot means pivotally connecting the first and second members allowing the second member to move about an axis between a first position and a second position, said pivot means having cylindrical means concentric with said axis, said first and second members having arcuate means cooperating with the cylindrical means to pivotally connect said first and second members, said arcuate means includes outwardly directed arcuate rib means on the first and second members, said arcuate rib means on the first and second members surrounding opposite portions of the cylindrical means, means surrounding said rib means and engageable with opposite ends of the cylindrical means, means holding said means surrounding said rib means in engagement with the cylindrical means, and biasing means mounted on the first and second members spaced from the pivot means to bias the second member to the first position, said biasing means including split ring spring means having a first end mounted on the first member and a second end mounted on the second member, said second end moving relative to said axis on movement of the second member to vary the split ring spring means torque arm relative to the axis so as to maintain a substantially constant biasing force on the second member during movement thereof between the first and second positions.

50. The assembly of claim 49 wherein: said first member has fixed stop means spaced from the pivot means, and said second member has means engageable with said stop means when the second member is in the first position and spaced from said stop means when the second member is in the second position.

51. The assembly of claim 50 wherein: the first member has a base engageable with the support, and first flange means secured to the base, said first flange means having pocket means located adjacent the fixed stop means accommodating the first end of the split ring spring means, said second member including second flange means having second pocket means located adjacent the means engageable with said stop means accommodating the second end of the split ring spring means.

52. The assembly of claim 51 including: first split sleeve means located in said first pocket means and about said first end of the split ring spring means, and second split sleeve means located in said second pocket means and about said second end of the split ring spring means.

53. The assembly of claim 49 wherein: said means surrounding said rib means comprises cap means having annular rim means surrounding said rib means.

54. The assembly of claim 49 including: earthworking tool means mounted on the movable member operable to work the soil when the second member is in the first position.

* * * * *

UNITED STATES PATENT AND TRADEMARK OFFICE
CERTIFICATE OF CORRECTION

PATENT NO. : 4,428,437
DATED : January 31, 1984
INVENTOR(S) : Richard W. Steinberg It is certified that error appears in the above-identified patent and that said Letters Patent are hereby corrected as shown below:

Column 4, line 5, "cyindrical should be --cylindrical--.

Column 5, line 37, "Bearing assembly 115" should be --Bearing assembly 114--.

Column 5, line 41, "he" should be --the--.

Signed and Sealed this

Fourth Day of September 1984

[SEAL]

Attest:

Attesting Officer

GERALD J. MOSSINGHOFF

Commissioner of Patents and Trademarks